United States Patent
Goerlitz et al.

(10) Patent No.: US 6,921,563 B2
(45) Date of Patent: Jul. 26, 2005

(54) MULTI-LAYER LAMINATE, PACKAGING MATERIAL AND PACKAGES MADE THEREFROM

(75) Inventors: Wolfram Goerlitz, Wiesbaden (DE); Ekkehard Beer, Bad Schwalbach (DE); Heinz Wegmann, Haldenwang (DE)

(73) Assignee: Ticona GmbH, Kelsterbach (DE)

( * ) Notice: Subject to any disclaimer, the term of this patent is extended or adjusted under 35 U.S.C. 154(b) by 0 days.

(21) Appl. No.: 10/155,957

(22) Filed: May 24, 2002

(65) Prior Publication Data

US 2003/0224130 A1 Dec. 4, 2003

(51) Int. Cl.$^7$ ............... B32B 27/10; B32B 27/12; B32B 27/32; B32B 29/00
(52) U.S. Cl. ............... 428/34.2; 428/476.3; 428/479.6; 428/512; 428/537.5
(58) Field of Search ............... 428/34.2, 476.3, 428/479.6, 512, 537.5

(56) References Cited

U.S. PATENT DOCUMENTS

| | | | | |
|---|---|---|---|---|
| 5,912,070 A | * | 6/1999 | Miharu et al. | 428/214 |
| 6,503,637 B1 | * | 1/2003 | Van Loon | 428/516 |
| 6,506,848 B2 | * | 1/2003 | Hoenig et al. | 525/331.8 |
| 6,525,123 B1 | * | 2/2003 | Yang et al. | 524/398 |
| 2002/0081358 A1 | * | 6/2002 | Galland et al. | 426/398 |
| 2002/0095003 A1 | * | 7/2002 | Cai et al. | 523/332 |

FOREIGN PATENT DOCUMENTS

| | | |
|---|---|---|
| EP | 1302311 | 4/2003 |
| JP | 08134800 | 5/1996 |
| JP | 10237234 | 9/1998 |
| WO | 02002324 | 1/2002 |
| WO | 03002343 | 1/2003 |

* cited by examiner

*Primary Examiner*—Harold Pvon
*Assistant Examiner*—Chris Bruenjes
(74) *Attorney, Agent, or Firm*—Michael W. Ferrell

(57) ABSTRACT

A multi-layer laminate comprising at least one layer of fiber material and at least one layer of plastic laminated thereto, which plastic layer comprises at least 50 weight percent of a cycloolefin copolymer. Also disclosed are packaging materials and packages made from the multi-layer laminate.

28 Claims, No Drawings

MULTI-LAYER LAMINATE, PACKAGING MATERIAL AND PACKAGES MADE THEREFROM

FIELD OF THE INVENTION

The present invention is directed to a multi-layer laminate which has improved moisture, oxygen, and aroma barrier properties.

BACKGROUND OF THE INVENTION

It is highly desirable that packages for perishable liquid or dry foods, such as milk products, juices, and cereals, be moisture-, oxygen- and aroma-proof for improving the durability of the product. The traditional packaging procedure has been to provide a fiber-based packaging material which includes a grey aluminum foil to provide an efficient protection against the penetration of moisture and oxygen into and the escape of aromas from the packed product. However, the customary use of aluminum foil in fiber-based packaging applications is now decreasing due to its high costs, environmental hazards and regulations concerning the recycling of materials. Aluminum does not decompose in landfills, and it is difficult to regenerate packaging cardboard lined with aluminum.

The use of aluminum as an oxygen and aroma barrier in food packages has been replaced by polymers to an increasing extent, the most important polymers being ethyl vinyl alcohol copolymer (EVOH), polyamide (PA), and polyethylene terephthalate (PET). By combining these polymers with binding agents and heat sealing polymers, a multi-layer cardboard can be formed, which has gas barrier characteristics almost comparable with aluminum. A disadvantage of these materials is their permeability to water vapor, and, therefore, all these materials have an undesirable high Moisture Vapor Transition Rate (MVTR).

In order to overcome this disadvantage, the use of polyolefin layers as moisture barriers has been attempted, either alone or in combination with the above-mentioned polymers. Low Density Polyethylene (LDPE) is a widely used polyolefin used for this purpose. For even lower MVTR rates, LDPE layers may be combined with high density polyethylene layers (HDPE). A disadvantage of these laminates is high film thicknesses required to obtain the necessary barrier properties.

In view of increasing material costs and tightening environmental regulations, another trend has been to decrease the amount of polymer used in coating packaging cardboard.

In view of the foregoing disadvantages associated with the prior art laminates and packaging materials, there remains a need for packaging materials that are characterized by improved barrier properties and that are environmentally friendly and inexpensive to manufacture.

BRIEF SUMMARY OF THE INVENTION

Advantageously, the present invention provides a packaging material having a lower MVTR at a given thickness, higher overall moisture barrier properties and a lower MVTR than prior art packaging materials.

These advantages have been accomplished by a multi-layer laminate comprising at least one layer of fiber material and at least one layer of plastic laminated to at least one surface of the fiber material layer, wherein the plastic layer comprises at least 50 weight percent of a cycloolefin copolymer.

The invention also relates to packaging materials comprising the multi-layer laminate according to the invention, and to packages made thereof. Such packages may have the shape of boxes or tumblers and may optionally have a handle.

DETAILED DESCRIPTION OF THE INVENTION

The MVTR of the multi-layer laminates according to the invention are generally about 3 to about 5 times lower than the MVTR of multi-layer laminates having LDPE as the moisture vapor barrier layer when the MVTR is measured at a temperature of 23° C. and 85% relative humidity. The MVTR of the claimed laminates are also about 2 to about 3 times lower than the MVTR of multi-layer laminates having a layer sequence of LDPE/HDPE/LDPE as the moisture vapor barrier layer when the MVTR is measured at 23° C. and 85% humidity. According to the invention, multi-layer laminates can be provided having an MVTR of 1.0 g per square meter per day with a coating thickness of 23 $g/m^2$. These barrier properties are about equal to the barrier properties obtained with more than 100 $g/m^2$ of LDPE as the moisture vapor barrier layer. The amount of plastic in packaging materials according to the invention are typically equal to or less than about 5 percent by weight of the total packaging.

Fiber material including but not limited to board, paper, kraft paper, cardboard or bleached sulphate pulp may be used as the base material for multi-layer laminates according to the invention. The multi-layer laminate may contain more than one layer of such materials.

In another embodiment, the multi-layer laminate comprises at least one layer consisting substantially of polyethylene.

In another embodiment, the plastic layer comprising the cycloolefin copolymer is a blend thereof with a polyethylene.

In general, any type of polyethylene, such as HDPE or LDPE, may be used for the purposes mentioned above, although the use of LDPE is preferred. Suitable polyolefins are described in Saechtling, Kunststoff-Taschenbuch, Hanser-Verlag, 27th edition, 1998, pages 375 to 415, which document is incorporated herein by reference.

In another embodiment of the invention, the plastic layer consists substantially of at least one cycloolefin copolymer. This embodiment can yield maximum barrier properties. However, such a layer can sometimes be difficult to laminate to the fiber material. An option to improve the adhesion between the plastic layer and other materials is a surface treatment of this layer, which treatment may lead to a partial oxidation of the surface. Examples are corona treatment, flame treatment and the like. The plastic layer may also comprise more than 60 percent by weight, typically 60 to 80 percent by weight, of a cycloolefin copolymer. The use of this embodiment provides improved adhesion to the fiber material and may be easily laminated to the fiber material, particularly if the plastic layer is a blend of about 60 to about 80 percent by weight of the cycloolefin copolymer with LDPE. Even types of paper which are particularly difficult to laminate may easily adhere to such a plastic layer. Cycloolefin copolymers usually show a high neck-in on film extrusion which can be reduced by coextrusion or blending of the cycloolefin copolymer with LDPE. The LDPE may have a Melt Flow Index (MFI) of about 4 to about 7.5.

In additional embodiments, different layer sequences may be created to optimize the multi-layer laminate for particular applications. Examples of such layer sequences include, but are not limited to:
(a) fiber material/plastic layer comprising a cycloolefin copolymer;
(b) fiber material/plastic layer comprising a cycloolefin copolymer/LDPE; and
(c) fiber material/LDPE/plastic layer comprising a cycloolefin copolymer/LDPE, wherein the fiber material is typically board or paper.

Further examples of multi-layer laminates in accordance with the invention have one of the following layer sequences:
(d) board/LDPE/plastic layer comprising a cycloolefin copolymer/LDPE/paper;
(e) board/plastic layer comprising a cycloolefin copolymer/LDPE/paper;
(f) board/plastic layer comprising a cycloolefin copolymer paper; and
(g) board/blend of LDPE and a cycloolefin copolymer/paper.

Such multi-layer laminates are particularly advantageous if contact between plastic and the package contents is to be avoided, or if the illusion of a pure paper packaging is desired. Such multi-layer laminates are particularly useful for foodstuffs or detergents, e.g. washing powder. Use of such packaging is also of particular advantage for washing powders which do not contain zeolithes and which are more moisture-sensitive than washing powders containing zeolithes.

If oxygen-barrier properties and/or aroma-barrier properties are desired, appropriate polymers having such properties, for example, EVOH and polyamides, may form part of the laminate. Another example of such a polymer is amorphous polyamides such as Selar® obtainable from DuPont. Examples of laminates having such polymer layer sequences include but are not limited to:
(h) fiber material/EVOH/tie/plastic layer comprising a cycloolefin copolymer/LDPE;
(i) fiber material/tie/EVOH/tie/plastic layer comprising a cycloolefin copolymer/LDPE; and
(j) fiber material/tie/plastic layer comprising a cycloolefin copolymer/tie/polymide.

In these embodiments, board is used as the fiber material. A tie layer may be necessary to ensure adhesion between the layers, particularly between the plastic layer comprising the cycloolefin copolymer and the EVOH and the polyamide.

The tie layer may comprise a modified polyolefin, and may consist substantially of a modified polyolefin. The modified polyolefin comprises a functional group such as carboxyl, carboxyl anhydride, metal carboxylate, carboxy ester, imino, amino, or epoxy in an amount of 1 percent by weight to 50 percent by weight of the modified polyolefin. Such modified polyolefins may comprise modified polyolefin copolymers or grafted copolymers, which may be obtained by incorporating groups such as maleic anhydride, fumaric anhydride, citric anhydride, n-phenylmaleimide, ncyclohexylmaleimide, glycidyl acrylate, glycidyl methacrylate, glycidyl vinyl benzoate, N-[4-(2,3-epoxpropoxy)-3,5-dimethylbenzyl]acrylamide (AXE), alkylmethacrylate, and/or derivatives thereof into polyolefins such as polyethylene, polypropylene, ethylene/propylene copolymers or polyamide grafted polyolefins. These products can be obtained by compounding the polyolefin with maleic anhydride or another substances such as mentioned above together with a radical initiator, for example AIBN or benzoyl peroxide.

The modified polyolefin is not limited in its degree of polymerization and may be an oligomer as well. Examples of modified polyolefins are:

maleic anhydride-modified polyethylene;
maleic anhydride-modified polypropylene;
maleic anhydride-modified polyethylene/polypropylene-copolymer;
fumaric acid-modified polyethylene;
fumaric acid-modified polypropylenes;
fumaric acid-modified polyethylene/polypropylene-copolymer;
glycidylmethacrylate-modified polyethylene;
glycidylmethacrylate-modified polypropylene;
AXE-modified polyethylene; and
AXE-modified polypropylene.

Other examples of materials which may be used in the tie layer are copolymers of ethylene with unsaturated esters such as vinyl acetate, (meth)acrylic esters such as ethyl methacrylate, and copolymers of ethylene with vinylalcohol. Particular mention is given to maleic acid-grafted polyethylene and maleic acid-grafted polypropylene.

The plastic layer comprising the cycloolefin copolymer may further comprise additives, such as lubricants or antioxidants, in an amount of up to 0.5 percent by weight. An example of an antioxidant is Irganox® available from Ciba Specialty Chemicals.

The layer thicknesses for the plastic layer comprising the cycloolefin copolymer are generally in the range of about 10 $g/m^2$ to about 50 $g/m^2$. If the film is a blend of a cycloolefin copolymer, the thickness is typically in the range of about 10 $g/m^2$ to about 20 $g/m^2$.

Additional layers of LDPE may have a thickness of from about 1 $g/m^2$ to about 10 $g/m^2$.

The thickness of a polyamide or EVOH layer may need to be adjusted to meet the desired oxygen barrier properties. Procedures for making such adjustments are within the expertise of the person of ordinary skill in the art.

The thickness of the fiber material layers and the plastic layers may be adjusted to meet the desired barrier properties or a given weight percentage of plastic content of the multi-layer laminate.

The overall thickness of the polymer layer on the fiber material generally is between about 5 $\mu$m and about 100 $\mu$m, typically between about 12 $\mu$m and about 50 $\mu$m, or between about 25 to about 40 $\mu$m. If the overall thickness exceeds 100 $\mu$m, processing becomes more difficult and therefore the thickness of the polymer layer is generally less than about 100 $\mu$m.

The cycloolefin copolymer used in the laminate generally has a glass transition temperature from about 60° C. to about 150° C., typically about 70° C. to about 100° C. Usually, the glass transition temperature is about 80° C. The cycloolefin copolymer may be a polymer comprising 0.1–99 mole %, typically 3–75 mole %, and in particular from 10 mole % to 65 mole % of cycloolefin copolymers. The cycloolefin copolymers may be polymerized units of at least one cyclic olefin of the formulae I, II, II', III, IV, V or VI,

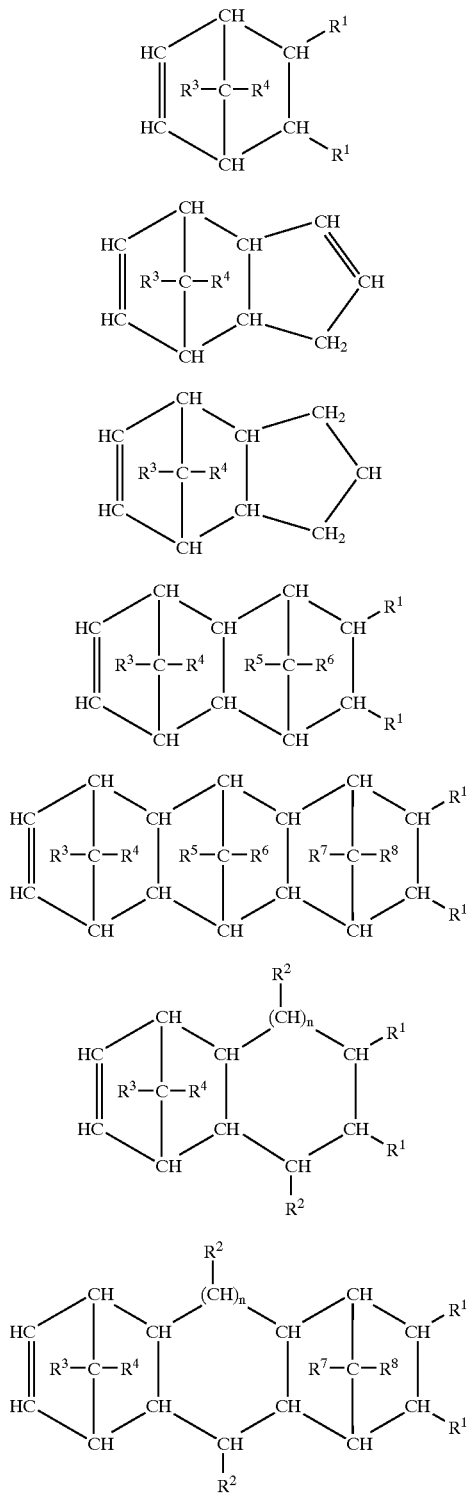

wherein $R^1$, $R^2$, $R^3$, $R^4$, $R^5$, $R^6$, $R^7$ and $R^8$ are the same or different and are hydrogen or a $C_1$–$C_{20}$-hydrocarbon group, such as a linear or branched $C_1$–$C_8$-alkyl group, a $C_6$–$C_{18}$-aryl radical, a $C_7$–$C_{20}$-alkylenaryl group, or a cyclic or acyclic $C_2$–$C_{20}$-alkenyl group, or may form a saturated, unsaturated or aromatic ring. In formulae I to VI, equal groups $R^1$ to $R^8$ can be the same or different, and n is an integer from 0 to 5.

The cycloolefin copolymer comprises from 25 to 97 mole %, typically from 35 mole % to 90 mole %, of the polymerized units and may be derived from at least one acyclic olefin of formula VII

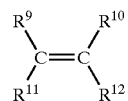

In formula VII, groups $R^9$, $R^{10}$, $R^{11}$ and $R^{12}$ are the same or different and are hydrogen, or a linear, branched, saturated or unsaturated $C_1$–$_{20}$-hydrocarbon group such as a $C_1$–$_8$-alkyl group or a $C_6$–$_{18}$-aryl group. Typically, the acyclic olefin is an α-olefin or ethylene.

Generally, the cycloolefin copolymer is a copolymer of ethylene, propylene or another alpha olefin having from 2 to 20 carbon atoms with at least one cyclic olefin of formula I, II, II', III, IV, V, or VI. In particular, the cycloolefin copolymer is a copolymer of norbornene or tetracyclododecene with ethylene or an alpha olefin such as propylene. Typically, the cycloolefin copolymer is a copolymer of ethylene and norbornene, or ethylene and tetracyclododecene.

Cycloolefin copolymers may be obtained by ring opening polymerization of at least one monomer of formulae I to VI, followed by a hydration step.

The cycloolefin copolymer may further comprise 0 to 45 mol-% polymerized units which are derived from one or more monocyclic olefins having formula VIII

wherein m is an integer from 2 to 10.

The amount of polymerized units which are derived from cyclic, particularly polycyclic, olefins is customarily from about 3 mol-% to about 75 mol-%. The amount of polymerized units derived from the acyclic olefin is typically from about 5 mol-% to about 80 mol-% of the cycloolefin copolymer.

Generally, the cycloolefin copolymer consists of polymerized units derived from one or more polycyclic olefins, particularly polycyclic olefins of formula I or II, and polymerized units which are derived from one or more acyclic olefins of the formula VII, particularly α-olefins with 2 to 20 carbon atoms. Particular cycloolefin copolymers consist of polymerized units derived from a polycyclic olefin of formula I or III and an acyclic olefin of formula VII. Additional suitable compounds are terpolymers, which consist of polymerized units derived from a polycyclic monoolefin of formula I or III, an acyclic monoolefin of the formula VII and a cyclic or acyclic olefin, comprising at least two double bonds (polyene), particularly cyclic and polycyclic dienes such as norbornadiene, or cyclic and polycyclic alkenes having a $C_2$–$_{20}$-alkenyl group, such as vinylnorbornene.

The cycloolefin copolymer can be prepared at temperatures of about –78° C. to about 200° C. and at a pressure of about 0.001 to about 200 bar in the presence of one or more catalyst systems. The catalyst system may comprise at least one transition metal compound and optionally a cocatalyst or a carrier material. Suitable transition metal compounds are metallocenes and stereorigid metallocenes. Examples of suitable catalyst systems are described in EP-A-407 870, EP-A-485 893 and EP-A-503 422, which documents are incorporated by reference.

Examples of suitable transition metal compounds are:
rac-dimethylsilylbis(1-indenyl)zirconium dichloride;
rac-dimethylgermylbis(1-indenyl)zirconium dichloride;
rac-phenylmethylsilylbis(1-indenyl)zirconium dichloride;
rac-phenylvinylsilylbis(1-indenyl)zirconium dichloride;
1-silacyclobutylbis(1-indenyl)zirconium dichloride;
rac-diphenylsilylbis(1-indenyl)hafnium dichloride;
rac-phenylmethylsilylbis(1-indenyl)hafnium dichloride;
rac-diphenylsilylbis(1-indenyl)zirconium dichloride;
rac-ethylene-1,2-bis(1-indenyl)zirconium dichloride;
dimethylsilyl(9-fluorenyl)(cyclopentadienyl)zirconium dichloride;
diphenylsilyl(9-fluorenyl)(cyclopentadienyl)zirconium dichloride;
bis(1-indenyl)zirconium dichloride;
diphenylmethylene(9-fluorenyl)cyclopentadienylzirconium dichloride;
isopropylene(9-fluorenyl)cyclopentadienylzirconium dichloride;
rac-isopropylidene-bis(1-indenyl)zirconium dichloride;
rac-isopropylidene-bis(4,5,6,7-tetrahydro-1-indenyl)zirconium dichloride;
phenylmethylmethylene(9-fluorenyl)cyclopentadienylzirconium dichloride;
isopropylene(9-fluorenyl)(1-(3-isopropyl)cyclopentadienyl)zirconium dichloride;
isopropylene(9-fluorenyl)(1-(3-methyl)cyclopentadienyl)zirconium dichloride;
diphenylmethylene(9-fluorenyl)(1-(3-methyl)cyclopentadienyl)zirconium dichloride,
methylphenylmethylene(9-fluorenyl)(1-(3-methyl)cyclopentadienyl)zirconium dichloride;
dimethylsilyl9-fluorenyl)(1-(3-methyl)cyclopentadienyl)zirconium dichloride;
diphenylsilyl(9-fluorenyl)(1-(3-methyl)cyclopentadienyl)zirconium dichloride;
diphenylmethylene(9-fluorenyl)(1-(3-tert-butyl)cyclopentadienyl)zirconium dichloride;
isopropylene(9-fluorenyl)(1-(3-tert-butyl)cyclopentadienyl)zirconium dichloride;
isopropylene(cyclopentadienyl)(1-indenyl)zirconium dichloride;
diphenylcarbonyl(cyclopentadienyl)(1-indenyl)zirconium dichloride;
dimethylsilyl(cyclopentadienyl)(1-indenyl)zirconium dichloride;
isopropylene(methylcyclopentadienyl)(1-indenyl)zirconium dichloride;
[4-($\eta^5$-cyclopentadienyl)-4,7,7-trimethyl($\eta^5$-4,5,6,7-tetrahydroindenyl)]-zirconium dichloride;
[4-($\eta^5$-cyclopentadienyl)-4,7,7-triphenyl($\eta^5$-4,5,6,7-tetrahydroindenyl)]zirconium dichloride;
[4-($\eta^5$-cyclopentadienyl)-4,7-dimethyl-7-phenyl($\eta^5$-4,5,6,7-tetrahydroindenyl)]zirconium dichloride;
[4-($\eta^5$-3'-tert-butylcyclopentadienyl)-4,7,7-triphenyl($\eta^5$-4,5,6,7-tetrahydroindenyl)] zirconium dichloride,
[4-($\eta^5$-3'-tert-butytcyclopentadienyl)-4,7-dimethyl-7-phenyl($\eta^5$-4,5,6,7-tetrahydroindenyl)] zirconium dichloride;
[4-($\eta^5$-3'-methylcyclopentadienyl)-4,7,7-trimethyl($\eta^5$-4,5,6,7-tetrahydroindenyl)] zirconium dichloride;
[4-($\eta^5$-3'-methylcyclopentadienyl)-4,7,7-triphenyl($\eta^5$-4,5,6,7-tetrahydroindenyl)] zirconium dichloride;
[4-($\eta^5$-3'-methylcyclopentadienyl)-4,7-dimethyl-7-phenyl ($\eta^5$-4,5,6,7-tetrahydroindenyl)] zirconium dichloride;
[4-($\eta^5$-3 '-isopropylcyclopentadienyl)-4,7,7-trimethyl($\eta^5$-4,5,6,7-tetrahydroindenyl)] zirconium dichloride;
[4-($\eta^5$-3'-isopropylcyclopentadienyl)-4,7,7-triphenyl ($\eta^5$-4,5,6,7-tetrahydroindenyl)] zirconium dichloride;
[4-($\eta^5$-3'-isopropylcyclopentadienyl)-4,7-dimethyl-7-phenyl($\eta^5$-4,5,6,7-tetrahydroindenyl)] zirconium dichloride;
[4-($\eta^5$-cyclopentadienyl)($\eta^5$-4,5-tetrahydropentalene)] zirconium dichloride;
[4-($\eta^5$-cyclopentadienyl)-4-methyl($\eta^5$-4,5-tetrahydropentalene)]zirconium dichloride;
[4-($\eta^5$-cyclopentadienyl)-4-phenyl-($\eta^5$-4,5-tetrahydropentalene)]zirconium dichloride;
[4-($\eta^5$-3'-methylcyclopentadienyl)($\eta^5$-4,5-tetrahydropentalene)]zirconium dichloride;
[4-($\eta^5$-3'-isopropylcyclopentadienyl)($\eta^5$-4,5-tetrahydropentalene)]zirconium dichloride;
[4-($\eta^5$-3'-benzylcyclopentadienyl)($\eta^5$-4,5-tetrahydropentalene)]zirconium dichloride;
[2,2,4-trimethyl-4-($\eta^5$-cyclopentadienyl)($\eta$-4,5-tetrahydropentalene)]zirconium dichloride; and
[2,2,4-trimethyl-4-($\eta$-(3,4-diisopropyl)cyclopentadienyl)($\eta$-4,5-tetrahydropentalene)] zirconium dichloride.

The multi-layer laminates according to the invention may be used for manufacturing packaging materials. From these packaging materials, packages for various products can be produced. The packages can have different shapes, such as boxes, tumblers or the like. Packages in the shape of tumblers or boxes can optionally have a handle to enable easy grip. Such packages can be used for the protection of moisture-sensitive foodstuffs, such as cereals, cornflakes, dried soups, chocolates, and cookies, and non-food goods, such as detergents, washing powder, zeolithe-free washing powder, and moisture sensitive chemicals. If desired, the package can be equipped to be heat-sealable. Such packages can be used for milk, soft-drinks, juices or similar items, for which particularly tight packages having low permeation rates are desirable. These packages can be in the shape of milk boxes. For heat-sealable packages, the fiber material can be formed using materials and/or layer sequences as described in U.S. Pat. Nos. 5,693,414 and 5,861,208, which documents are incorporated by reference.

The claimed invention will be further described with reference to the following non-limiting examples.

EXAMPLES

The following data was common to each of the following Examples:

The cycloolefin copolymer (COC) used was TOPAS® 8007, available from Ticona GmbH, Kelsterbach. The LDPE used had a density of 922 kg/m$^3$, and an MFI of 7 g/10 minutes. The HDPE used had a density of 964 kg/m$^3$ and an MFI of 4 g/10 minutes. The modified polyethylene used as tie layer was Bynel® available from DuPont. The amorphous polyamide used was Selar® available from DuPont. The board used had a thickness of 385 g/m$^2$, and the kraft paper had a thickness of 65 g/m$^2$.

Tropical conditions refer to a temperature of 38° C. and a relative humidity of 90%. Normal conditions refer to a temperature of 23° C. and a relative humidity of 85%. MVTR values are given in g/m$^2$ 24 h. MVTR was measured according to DIN 53122.

Example 1

Three board-containing laminates were prepared:
A) board/LDPE
B) board/LDPE/HDPE/LDPE
C) board/LDPE/COC/LDPE.

The board used was covered with different layer sequences by means of coextrusion. Examples A and B are comparative examples showing prior art laminates, whereas Example C was prepared in accordance with the claimed invention. The overall plastic layer thickness was 24 g/m². The layer thicknesses in examples B and C were 3/18/3 g/m².

Table 1 shows MVTR values for the laminates of Example 1. As can be seen, the MVTR values are significantly improved by the use of COC (Example C).

TABLE 1

| Example | MVTR normal | MVTR trop. |
|---------|-------------|------------|
| A | 4.8 | 19 |
| B | 2.5 | 9.2 |
| C | 1.0 | 3.2 |

Example 2

Different multi-layer laminates of board with COC-LDPE blends were produced with different layer thicknesses (given in μm). The results provided in Table 2 demonstrate that the COC-containing laminates had low MVTR properties. The addition of COC to LDPE significantly improved the MVTP properties of the laminates at all film thickness and temperature/humidity conditions.

TABLE 2

| | | 100 μm | | 25 μm | | 12 μm | |
|---|---|---|---|---|---|---|---|
| Material | | 38° C./90% | 23° C./85% | 38° C./90% | 23° C./85% | 38° C./90% | 23° C./85% |
| 100% COC | | 1.0 | 0.3 | 4 | 1.2 | 8 | 2.4 |
| Blends | 20% LDPE | 1.2 | 0.3 | 5 | 1.2 | 10 | 2.6 |
| | 40% LDPE | 1.5 | 0.4 | 6 | 1.4 | 13 | 2.9 |
| | 60% LDPE | 2.4 | 0.4 | 10 | 1.7 | 20 | 3.5 |
| | 80% LDPE | 3.9 | 0.6 | 16 | 2.3 | 32 | 4.8 |
| 100% LDPE | | 4.8 | 0.9 | 19 | 3.7 | 40 | 7.7 |

Example 3

The following multi-layer laminates were produced by coextrusion to investigate the influence of layer thicknesses of COC on the MVTR under tropical conditions:

| | |
|---|---|
| A) LDPE | MVTR: 35 |
| B) LDPE/COC/LDPE, layer thicknesses 2/4/7 g/m² | MVTR: 15 |
| C) LDPE/COC/LDPE, layer thicknesses 2/9/2 g/m² | MVTR: 9 |

Example A is a comparative example with a single LDPE layer (thickness 13 g/m²). MVTR given in g/m² 24 h. The data shows that the use of a COC layer significantly improved the MVTR values compared to LDPE.

Example 4

To obtain a laminated article with maximum barrier properties and moderate weight, a layer sequence was extruded with the following layer sequence: board/LDPE (2 g/m²)/COC (19 g/m²)/LDPE (2 g/m²)/kraft paper. The MVTR at normal conditions was determined to be 1 g/m² 24 h. The barrier properties are roughly equivalent to 100 g/m² LDPE coating weight. This laminating material combines excellent moisture barrier while containing less than 5% by weight of plastic.

Example 5

To obtain a laminated article having excellent moisture barrier properties, board was coated with a COC layer of 40 μm and a LDPE layer of 10 μm thickness. The MVTR value obtained under tropical conditions is 2 g/m² 24 h. This Example illustrates the high barrier properties obtained with a practical layer thickness.

Example 6

To obtain a laminated article with excellent MVTR and oxygen transmission rate (OTR), a laminated article having the layer sequence of board/tie (3 g/m²)/COC (10 gm²)/tie (3 g/m²)/amorphous polyamide (5 μm) was produced. The MVTR of the material was 9 g/m² 24 h, and the OTR was 80 cm³/m² 24 h bar, showing favorable barrier properties.

Numerous modifications and variations of the present invention are possible in light of the above teachings, and therefore the claimed invention may be practiced other than as explicitly described.

What is claimed is:

1. A multi-layer extruded laminate comprising at least one layer of a fiber material and at least one layer of a plastic layer laminated to at least one surface of the fiber material layer, wherein:
   the plastic layer consists essentially of 50–100 weight percent of a cycloolefin copolymer and 0–50 weight percent of a polyolefin, and optionally one or more additives, wherein said cycloolefin copolymer comprises between about 3 mol % and about 75 mol % polymerized units of cycloolefin, wherein the cycloolefin copolymer has a glass transition temperature of about 60° C. to about 150° C.; and
   wherein none of the layers of the laminate are biaxially stretched.

2. The multi-layer laminate according to claim 1, further comprising at least one substantially polyethylene layer.

3. The multi-layer laminate according to claim 2, wherein the polyethylene is a low density polyethylene (LDPE).

4. The multi-layer laminate according to claim 1, wherein the fiber material is selected from the group consisting of board, paper, kraft paper, cardboard, bleached sulhate pulp, and mixtures thereof.

5. The multi-layer laminate according to claim 1, whereas the plastic layer is a blend of the cycloolefin copolymer and polyethylene.

6. The multi-layer laminate according to claim 5, wherein the polyethylene is low density polyethylene (LDPE).

7. The multi-layer laminate according to claim 5 or 6, wherein the cycloolefin copolymer comprises more than 50 percent by weight of the plastic layer.

8. The multi-layer laminate according to any one of claims 1, 5, and 6, wherein the cycloolefin copolymer comprises more than 60 percent by weight of the plastic layer.

9. The multi-layer laminate according to any one of claims 1, 5, and 6, wherein the cycloolefin copolymer comprises from 60 to 80 percent by weight of the plastic layer.

10. The multi-layer laminate according to claim 1, wherein the weight of the plastic layer is 5% or less of the weight of the laminate.

11. The multi-layer laminate according to claim 1 having a layer sequence of fiber layer/plastic layer/polyethylene layer.

12. The multi-layer laminate according to claim 1 having the layer sequence of fiber layer/polyethylene layer/plastic layer/polyethylene layer/fiber layer.

13. The multi-layer laminate according to claim 1 having the layer sequence of fiber layer/plastic layer/polyethylene layer/fiber layer.

14. The multi-layer laminate according to claim 1 having the layer sequence of fiber layer/plastic layer/fiber layer.

15. The multi-layer laminate according to any one of claims 11–14, wherein the fiber layer material is board or paper.

16. The multi-layer laminate according to any one of claims 11–14, whereas the plastic layer is a blend of a cycloolefin copolymer and a polyethylene.

17. The multi-layer laminate according to claim 1 having the layer sequence of a) board layer/plastic layer/polyethylene layer; or b) paper layer/plastic layer/polyethylene layer.

18. The multi-layer laminate according to claim 1 having the layer sequence of board layer/polyethylene layer/plastic layer/polyethylene layer/paper layer.

19. The multi-layer laminate according to claim 1 having the layer sequence of board layer/plastic layer/polyethylene layer/paper layer.

20. The multi-layer laminate according to claim 1 having the layer sequence of board layer/plastic layer/paper layer.

21. The multi-layer laminate according to claim 1 further comprising an oxygen barrier layer consisting substantially of an ethylvinyl alcohol polymer or an amorphous polyamide.

22. A packaging material formed from the multi-layer laminate according to any one of claim 1, 5, 6, or 21.

23. A package for moisture-sensitive products comprising the packaging material according to claim 22.

24. The package according to claim 23 in the shape of a box or tumbler, optionally having a handle.

25. The multi-layer extruded laminate in claim 1, wherein said cycloolefin copolymer consists essentially of the residues of norbornene and ethylene.

26. The multi-layer extruded laminate in claim 1, wherein said cycloolefin copolymer consists essentially of the residues of ethylene and tetracylododecene.

27. The multi-layer extruded laminate in claim 1, wherein the polymerized cycloolefin has a glass transition temperature of about 80° C.

28. The multi-layer extruded laminate in claim 1, wherein the polymerized cycloolefin has a glass transition temperature from about 70° C. to about 100° C.

* * * * *